US008688744B2

(12) United States Patent  (10) Patent No.: US 8,688,744 B2
Williams et al.  (45) Date of Patent: Apr. 1, 2014

(54) METHOD, SYSTEM, AND APPARATUS FOR SCANNING AND IMPORTING DOCUMENTS

(75) Inventors: Meredith A. Williams, Manteno, IL (US); Michael B. Cronin, Munster, IN (US); Tracy E. Ustinov, Park Forest, IL (US); Matthew R. Beal, Lansing, IL (US); Charles O. Mahaffey, Portage, IN (US)

(73) Assignee: Applied Systems, Inc., University Park, IL (US)

( * ) Notice: Subject to any disclaimer, the term of this patent is extended or adjusted under 35 U.S.C. 154(b) by 1011 days.

(21) Appl. No.: 12/207,449

(22) Filed: Sep. 9, 2008

(65) Prior Publication Data

US 2010/0091317 A1  Apr. 15, 2010

(51) Int. Cl.
G06F 7/00 (2006.01)
G06F 17/30 (2006.01)

(52) U.S. Cl.
USPC ........................................ 707/802

(58) Field of Classification Search
USPC ........................................ 707/802
See application file for complete search history.

(56) References Cited

U.S. PATENT DOCUMENTS

| | | | |
|---|---|---|---|
| 4,879,718 A | 11/1989 | Sanner | |
| 5,265,252 A | 11/1993 | Rawson | |
| 6,003,093 A | 12/1999 | Kester | |
| 6,425,001 B2 | 7/2002 | Lo | |
| 6,714,998 B2 | 3/2004 | Hara | |
| 6,795,846 B1 | 9/2004 | Merriam | |
| 7,293,114 B2 | 11/2007 | Yashiki | |
| 7,310,162 B2 | 12/2007 | Morris-Jones | |
| 7,318,083 B2 | 1/2008 | Senda | |
| 7,389,516 B2 | 6/2008 | Rosenbloom | |
| 2001/0011281 A1 | 8/2001 | Fry | |
| 2001/0043369 A1* | 11/2001 | Melen | 358/468 |
| 2003/0101289 A1 | 5/2003 | Alikberov | |
| 2003/0200234 A1* | 10/2003 | Koppich et al. | 707/203 |
| 2004/0078337 A1 | 4/2004 | King | |
| 2004/0215510 A1 | 10/2004 | Wilkie | |
| 2005/0134935 A1* | 6/2005 | Schmidtler et al. | 358/448 |
| 2007/0110276 A1 | 5/2007 | OConnell | |
| 2007/0177824 A1 | 8/2007 | Cattrone | |

(Continued)

FOREIGN PATENT DOCUMENTS

EP   1482436   12/2004

OTHER PUBLICATIONS

International Search Report mailed Oct. 26, 2009 and International Preliminary Report on Patentability mailed Mar. 24, 2011 for International Application No. PCT/US2009/056375.
Code 128 Symbology, Copyright 2006 BarCodeIsland.com, Inc., [retrieved from the Internet] URL: <http://www.barcodeisland.com/code128phtml on May 15, 2009>.

(Continued)

Primary Examiner — Kuen Lu
(74) Attorney, Agent, or Firm — K&L Gates LLP

(57) ABSTRACT

The system, method, and apparatus provides a device for scanning documents and importing and forwarding scanned documents based on document identifiers. Documents are received and reviewed for entry into the document management system. An identifier is associated with each document based on the level of available information about the document. An identifier is assigned to each document. Each document with its assigned identifier is scanned. Documents are then imported into the document management system or forwarded to a recipient for additional review. Separator identifiers may be used to increase efficiency. Further, the system may allow certain users to use reporting functions to access information about the document management system and the recipients of documents.

17 Claims, 3 Drawing Sheets

(56) References Cited

U.S. PATENT DOCUMENTS

2008/0101597 A1 5/2008 Nolan
2008/0104615 A1 5/2008 Nolan
2008/0134216 A1 6/2008 Shoji
2008/0148370 A1 6/2008 Allwright

OTHER PUBLICATIONS

Acquiring Images through VChannel, updated May 12, 2005 [retrieved from the Internet] URL: <http://asi-intranet/intranet/division/tech/department/datacenteroperations/documentation/vc . . . on May 15, 2009>.

* cited by examiner

METHOD, SYSTEM, AND APPARATUS FOR SCANNING AND IMPORTING DOCUMENTS

CROSS-REFERENCE TO RELATED APPLICATIONS

This application is related to the following co-pending commonly-owned patent applications: U.S. application Ser. No. 12/207,448 filed Sep. 9, 2008, entitled "METHOD AND APPARATUS FOR REMOTELY DISPLAYING SCREEN FILES AND EFFICIENTLY HANDLING REMOTE OPERATOR INPUT," currently pending; U.S. application Ser. No. 12/207,425 filed Sep. 9, 2008, entitled "METHODS AND APPARATUS FOR DELIVERING DOCUMENTS," currently pending; U.S. application Ser. No. 12/207,442 filed Sep. 9, 2008, entitled "METHOD AND APPARATUS FOR DISPLAYING A MENU FOR ACCESSING HIERARCHICAL CONTENT DATA INCLUDING CACHING MULTIPLE MENU STATES," currently pending; and U.S. application Ser. No. 12/207,436 filed Sep. 9, 2008, entitled "METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE," currently pending; and U.S. application Ser. No. 12/207,454 filed Sep. 9, 2008, entitled "METHOD, SYSTEM, AND APPARATUS FOR SECURE DATA EDITING," currently pending, the entire contents of each of which is incorporated by reference herein.

TECHNICAL FIELD

The present application relates in general to document management and more specifically to a method, system, and apparatus for scanning and importing documents.

BACKGROUND

Document management is typically an integral part of running a business, particularly when a business has remotely located business locations. Many businesses receive hundreds or thousands of documents every day from outside sources at various locations. These documents typically need to be filed and/or forwarded correctly for proper operation of a business. Received documents are typically routed to the appropriate person, department, or file location via hand delivery, email, or other delivery services to the appropriate offices or file rooms. The number of received documents often requires substantial efforts and costs in determining the appropriate location for each document and delivering each document to its appropriate location.

SUMMARY

The present disclosure provides a new and innovative method, system, and apparatus for scanning and importing documents. Specifically, the disclosed system provides a device for scanning documents and importing and forwarding scanned documents based on document identifiers. Documents are received and reviewed for entry into the document management system. An identifier is associated with each document based on the level of available information about the document. Then an identifier is assigned to each document, and documents and identifiers are scanned. Documents are then imported into the document management system or forwarded to a recipient for additional review. Separator identifiers may be used to increase efficiency. Further, certain users may have access to reporting functions to access information about the document management system. The disclosed system provides an efficient and improved system for remotely managing documents.

Additional features and advantages are described herein, and will be apparent from the following Detailed Description and the figures.

DETAILED DESCRIPTION

Figure 1:
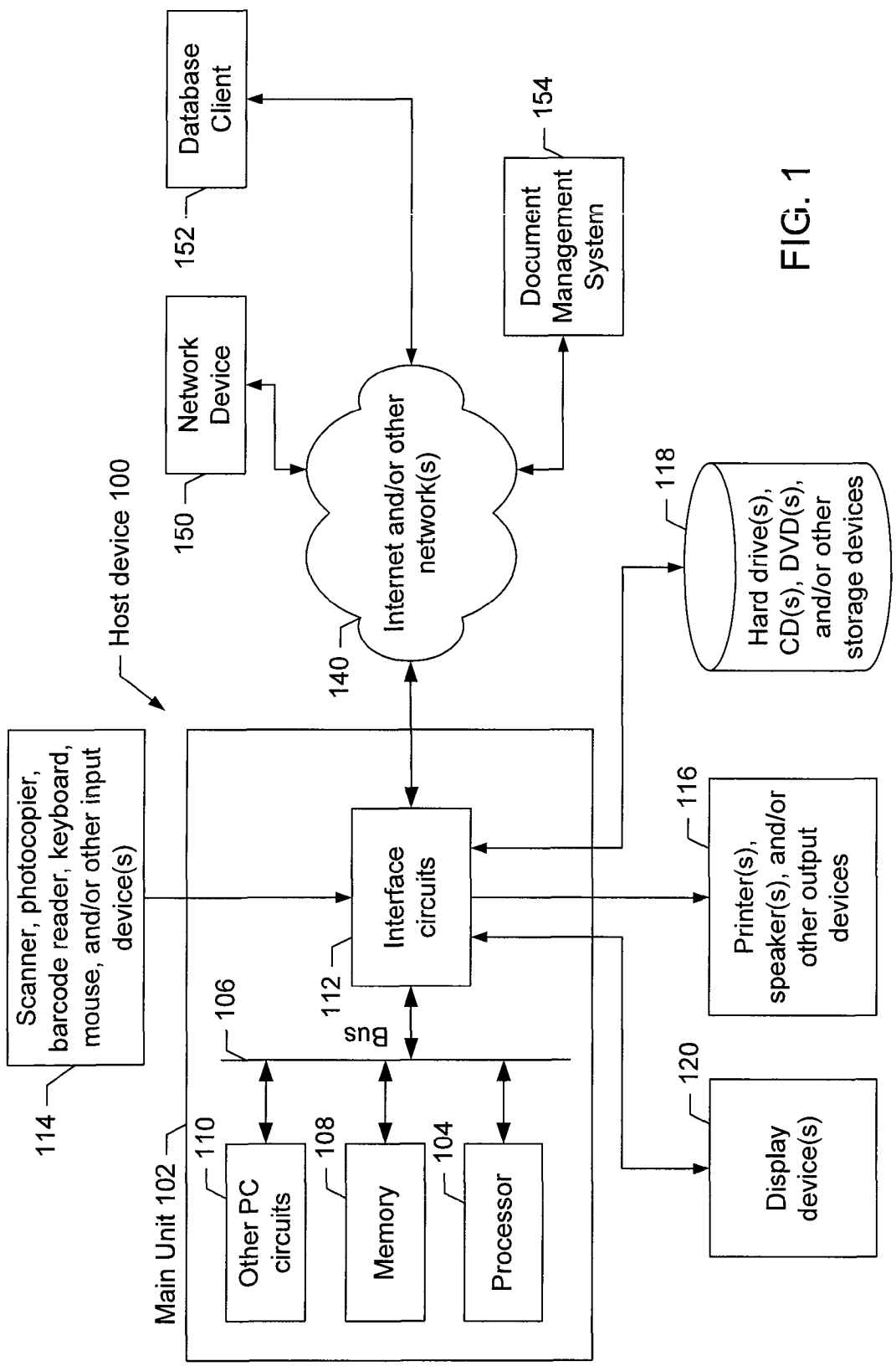
FIG. 1 is a block diagram of the electrical systems of an example architecture for a host device for implementing a scanning and importing document management system.

FIG. 1 is a block diagram of the electrical systems of an example architecture for a host device 100 for implementing the document scanning and importing system disclosed herein. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes volatile memory and non-volatile memory. Preferably, the memory 108 stores a software program that interacts with the other devices in the system as described below. This program may be executed by the processor 104 in any suitable manner. The memory 108 may also store digital data indicative of documents, files, programs, web pages, etc. retrieved from processor 104, storage device 118, network device 150, database client 152, document management system 154, and/or loaded via an input device 114.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a scanner, photocopier, barcode reader, keyboard, mouse, touch screen, track pad, track ball, isopoint, and/or a voice recognition system. In an example described in more detail below, an input device 114 may be used to scan documents and document identifiers for importing the documents into a document management system 154. Data scanned from an input device 114 may be stored on any directory accessible to the host device 100.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 generates visual displays of data generated during operation of the host device 100. The visual displays may include prompts for human input, run time statistics, calculated values, data, etc.

One or more storage devices 118 may also be connected to the main unit 102 via the interface circuit 112. For example, a hard drive, CD drive, DVD drive, and/or other storage devices may be connected to the main unit 102. The storage devices 118 may store any type of data used by the host device 100. For example, the storage device 118 may store scanned documents, scanned document identifiers, and archived document identifiers.

The host device 100 may also exchange data with a network device 150, a remote database client 152, and/or a document management system 154 using a connection to network 140. For example, a remotely located host device 100 may connect to a network device 150, database client 152, and/or document management system 154 via a remote desktop protocol connection. Storage devices 118 may be exposed to the network devices 150, database client 152, and/or document management system 154 via the network 140. The network connection 140 may be any suitable network connection, such as an Ethernet connection, digital subscriber line (DSL), telephone line, coaxial cable, etc. Access to a host device 100 may be controlled by appropriate security software or security measures. An individual user's access can be defined by the host device 100 and limited to certain data and/or actions. For example, certain users may be allowed transmit scanned document data to a document management system 154 which may operate with network device 150 and/or database client 152. Additionally, certain users may also have the ability to view reports regarding document management system 154 and associated data flow. Accordingly, users of the system may be required to register with a host device 100. The data exchanged between the host device 100 and the network device 150, database client 152, and/or document management system 154 may include document data (i.e., scanned document identifiers and documents from an input device 114), forms and associated data (i.e., a web page for data entry and inputs from an input device 114), screen files (i.e., image data for display at the database client 152), trapped events at the database client 152, and raw data including data stored on the storage device 118 and manipulable at the network device 150, database client 152, and/or document management system 154.

Figure 2:
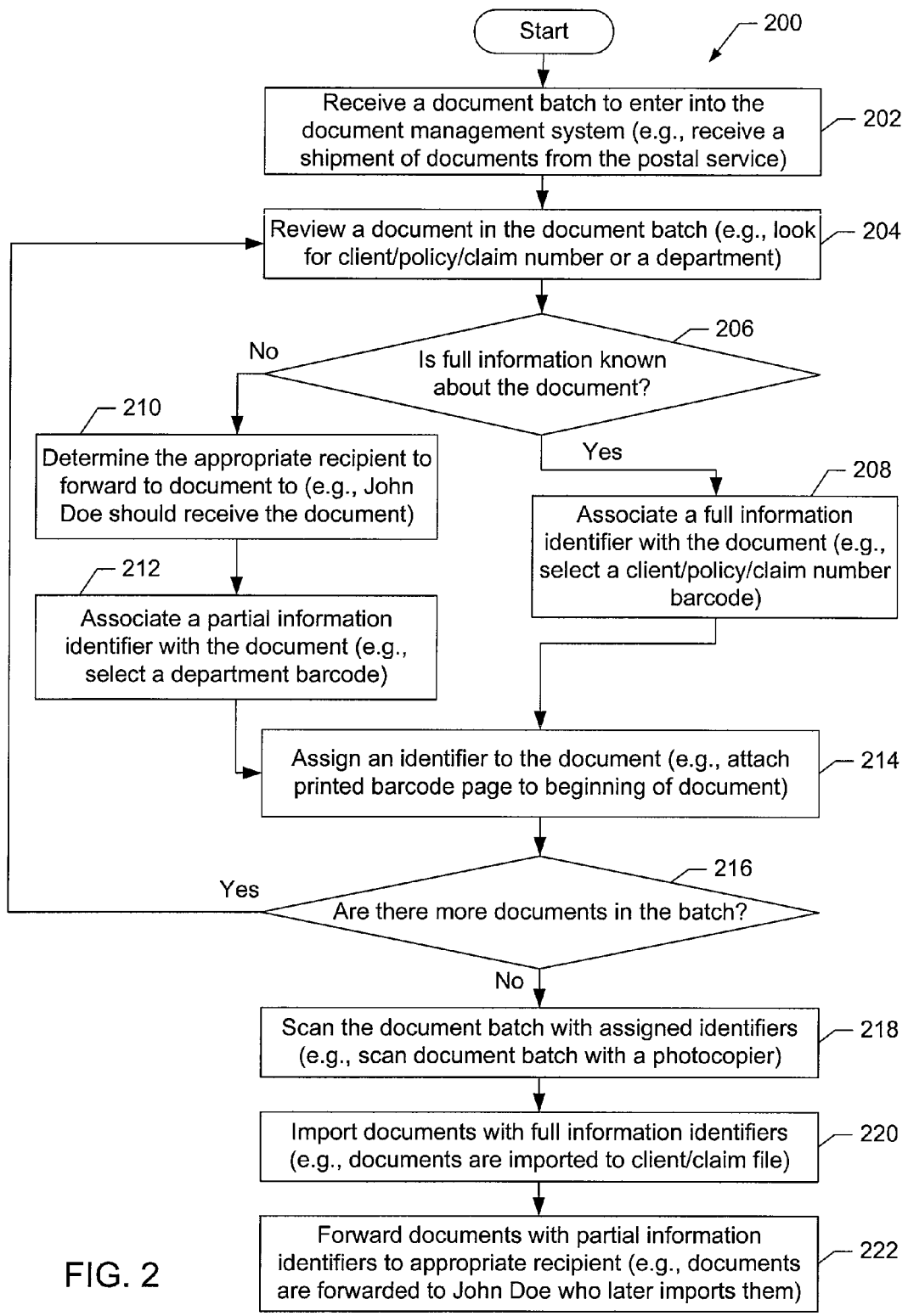
FIG. 2 is a flow chart of an example document scanning and importing process.

FIG. 2 is a flowchart of an example document scanning and importing process 200. In general, documents are received and reviewed for entry into the document management system 154. An identifier is associated with each document based on the level of available information about the document. Then an identifier is assigned to each document, and documents and identifiers are scanned. Documents are then imported into the document management system or forwarded to a recipient for additional review. Although the document scanning and importing process 200 is described with reference to the flowchart illustrated in FIG. 2, it will be appreciated that many other methods of performing the acts associated with the example document scanning and importing process 200 may be used. For example, the order of many of the blocks may be changed, and many of the blocks described are optional.

The example document scanning and importing process 200 begins by receiving a batch of documents to enter into the document management system (block 202). For example, a business receives a daily shipment of documents from the postal service. Documents may be received from multiple sources to form a document batch, including delivery service, facsimile, telegram, etc. For example, the employee may prepare some documents, receive some documents from other employees, and receive documents from outside the company. An employee may receive a document in an electronic format that is not supported by the document management system 154, which may be printed as a hard copy with an output device 116. A batch may be broken into several smaller batches, and in some cases, a batch may include only one document.

Once a batch of documents has been received, review a document in the batch (block 204). For example, an employee of an insurance company may look at the first document of the batch checking for a client/policy/claim number or a department that should review the document. The employee may not be have much information about documents that are not generated by the employee.

After reviewing a document, determine if full information is known about the document (block 206). For example, in a document management system where files are organized by client, then policy, then claim, if each of these variables are known, an employee may know exactly which file the document should be stored in. However, if only a client and policy is known, the document cannot simply be imported into the document management system because additional information is required to properly file the document.

If full information is known about the document, associate a full information identifier with the document (block 208). For example, an employee selects a client/policy/claim number barcode. An employee may select a barcode or other identifier in a variety of ways. For example, a barcode may be selected from binder, stack, folder, or other location in an employees office. If an employee commonly receives documents for a certain client/policy/claim, the employee may keep barcode identifiers readily available for quick and easy access. Alternatively, if a document is received that is uncommon for an employee, a barcode identifier may be pulled up from a storage device 118 and printed with an output device 116. Accordingly, an employee is not required to keep hundreds or thousands of identifiers accessible for use with host device 100. Further, the act of associating an identifier does not necessarily require any physical act. For example, as described in more detail below, an employee may associate an identifier by determining the client/policy/claim number of a document without actually obtaining the client/policy/claim number physical identifier for that document.

An identifier may include any optical indicator such as a conventional 1D barcode, a 2d data matrix barcode, an alphanumeric string recognizable via optical character recognition, punch card, etc. Preferably, the identifier may be scanned in the same manner as the document. For example, the identifier is a barcode on a printed piece of paper that is the same size as the document. It should be appreciated that identifiers may come in a variety of forms. Identifiers may be reusable and/or disposable. For example, a high volume identifier may be printed on heavy stock and reused many times or may be printed on normal paper and disposed of after use.

If full information is not known about the document, determine the appropriate recipient to forward the document to (block 210). For example, a manager John Doe should receive the document. A recipient may be any person, (i.e., employee, manager, contractor), department (i.e., accounting, marketing), any physical location (i.e., Chicago office), electronic storage (i.e., database, junk mail filtering server, project folder), etc. As will be described in more detail below, a recipient will receive the document, and may have additional information such as a client/policy/claim number. A recipient may also be a folder for documents that are reviewed but provide no information to determine a recipient. Documents of this unknown nature may be made available in a daily email for a certain group of employees, where an employee in the group may be able to provide information.

Once the appropriate recipient has been determined, associate a partial information identifier with the document (block 212). For example, an employee selects department barcode. Preferably, all possible recipients would have an identifier that may be associated with a document. The identifier may be preset, or may be generated once the identifier is required. For example, a new employee may not have a preset barcode until a document must be sent to that new employee, at which time it is automatically generated.

Once a full information identifier or a partial information identifier has been associated with a document, assign an identifier to the document (block 214). For example, an employee attaches an identifier to the front of a document. The identifier attached will typically be the same identifier which was associated with the document. However, an identifier that is assigned to a document may be different from the associated identifier. For example, as described in more detail below, a separator identifier may be assigned to a document. Preferably, a standard method of assigning identifiers to documents is used. For example, an identifier barcode may always be attached as the first page of a document to be scanned by an input device 114.

Once an identifier has been assigned to a document, determine if there are more documents in the batch (block 216). If there are additional documents, review each additional document according to the above described document scanning and importing process 200.

If there are no more documents in the batch, scan the document batch with the assigned identifiers (block 218). For example, an employee may scan a document batch with a photocopier. The document batch may include three documents each with an assigned identifier (i.e., full information barcode A, document A, partial information barcode B, document B, full information barcode C, document C).

Once the document batch has been scanned, import documents with full information identifiers assigned to them (block 220). For example, documents are imported to the appropriate client/policy/claim file location within the document management system 154. The document management system 154 may process the documents in a variety of ways for importation. Preferably, the scanned batch of documents will be imported into the document management system 154 with the identifiers stripped out so the documents will be imported in their original clean format. It will be appreciated that document data may be manipulated and compressed in a variety of ways. Further, the history of each document may be tracked by the document management system 154, the host device 100, network devices 150, and/or the database client 152.

Once documents with full information identifiers assigned to them are imported, forward documents with partial information identifiers assigned to them (block 222). For example, documents are forwarded to the appropriate recipient. The documents may be forwarded in a variety of ways. For example, the documents may be converted into a standard email message with attachments to the recipients email inbox. Accordingly, the recipient may import the document into management system 154, save the document locally, recycle the document, and/or forward the document to a more appropriate recipient. Further, the history for each document including all messages may be tracked by the document management system 154, the host device 100, network devices 150, and/or the database client 152. Additionally, certain users may have access to reporting capabilities. For example, an inbox administrator may view reports on the inbox statistics of each recipient. The reports may include information such as how many documents are in each recipient's inbox, the average amount of time it takes each recipient to take action on items within their inbox, and how long documents have remained in a recipient's inbox. Accordingly, the inbox administrator may ensure efficient use of the example document scanning and importing process 200 by ensuring that documents that are associated with partial information identifiers are handled by the recipients with appropriate dispatch.

Figure 3:
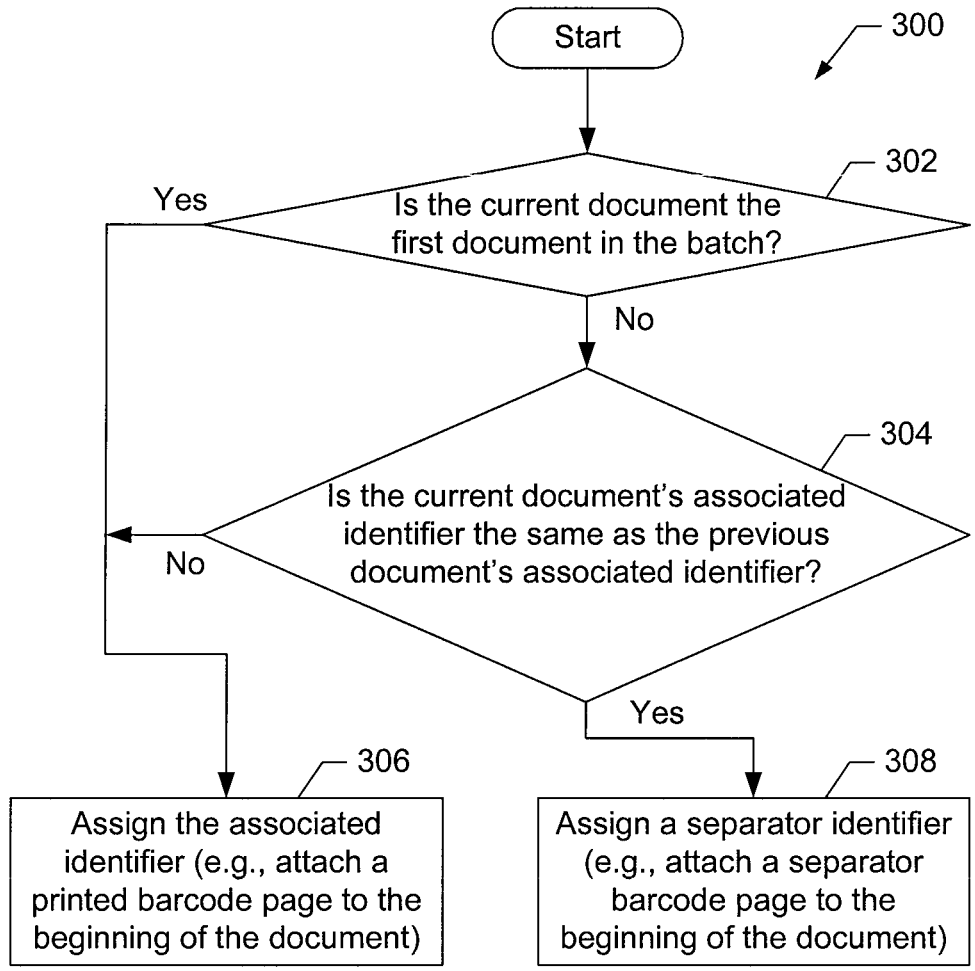
FIG. 3 is a flow chart of an example identifier assignment process.

FIG. 3 is a flowchart of an example identifier assignment process 300. Although the example identifier assignment process 300 is described with reference to the flowchart illustrated in FIG. 3, it will be appreciated that many other methods of performing the acts associated with example identifier assignment process 300 may be used. For example, the order of many of the blocks may be changed, and many of the blocks described are optional.

The example identifier assignment process 300 begins by determining if the current document is the first document in the batch (block 302). If the document is the first document in the batch, assign the associated identifier to the document (block 306). For example, an employee may attach a printed barcode page to the beginning of the first document in the batch.

If the document is not the first document in the batch, determine if the current document's associated identifier is the same as the previous document's associated identifier (block 304). If the identifier associated with the present document is not the same as the identifier associated with the previous document, then assign the associated identifier to the document (block 306). For example, an employee may attach a printed barcode page to the beginning of the third document in the batch.

If the identifier associated with the present document is the same as the identifier associated with the previous document, then assign a separator identifier to the document (block 308). For example, an employee may attach a separator barcode page to the beginning of the fifth document in the batch. A separator identifier indicates that a document should be imported or forwarded in the same manner as the previous document. It should be appreciated that an employee may associate a client/policy/claim number barcode with a document but not take any action on that association, and may assign a separator barcode instead. Such a technique of not, for example, printing an associated barcode may save considerable time. It should be appreciated that the example document scanning and importing process may be optimized by making appropriate use of separator identifiers.

If five documents are to be forwarded to a recipient, using one partial information identifier and four separator identifiers may save time. For example, an employee may have an easily accessible stock of separator identifiers, whereas each partial information identifier may have to be printed via an output device 116. Similarly, if ten documents are to be imported for the client/policy/claim number into the document management system 154, using one full information identifier and nine separator identifiers may save time. For example, an employee may have a stack of separator identifiers sitting next to the scanner, and may need to print each full information identifier using an output device 116.

It should be appreciated that a person reviewing a document batch, such as an employee, may organize the document batch to make the scanning and importing process 200 more efficient. For example, if a document batch is received with several documents for each of two recipients, with the documents in alternating fashion, the documents could be rearranged so that the recipients documents are segregated from each other. Accordingly, separator identifiers could be used to save time. However, for large batches of documents, it may be inefficient to attempt to rearrange the documents to use separator identifiers.

It should be understood that various changes and modifications to the presently preferred embodiments described herein will be apparent to those skilled in the art. Such The invention is claimed as follows:

1. A method for scanning and importing documents into a document management system, comprising:
   receiving a first document for entry into the document management system;
   determining the first document provides first sufficient information for the first document to be imported into the document management system;
   associating a first identifier with the first document, the first identifier providing importing information to the document management system, wherein the first identifier is selected based on the first sufficient information;
   receiving a second document for entry into the document management system;
   determining the second document provides insufficient information for the second document to be imported into the document management system;
   associating a second identifier with the second document, the second identifier providing recipient information to the document management system, wherein the second identifier is selected from a plurality of different recipients based on the insufficient information;
   scanning the first identifier, the first document, the second identifier, and the second document;
   importing the first document into the document management system based on the first identifier; and
   forwarding the second document to a recipient based on the second identifier, wherein the second document is not imported into the document management system until the recipient provides second sufficient information for the second document to be imported into the document management system.

2. The method of claim 1, further comprising:
   receiving the second document at an inbox associated with the recipient; and
   importing the second document into the document management system from the inbox.

3. The method of claim 2, wherein an inbox administrator views reports on inbox statistics of the recipient.

4. The method of claim 1, further comprising:
   associating a third identifier with the second document, the third identifier providing importing information to the document management system, wherein the third identifier is selected based on the second sufficient information;
   scanning the third identifier and the second document; and
   importing the second document into the document management system based on the third identifier.

5. The method of claim 1, wherein the first sufficient information includes at least one of a client number and a client name.

6. The method of claim 1, wherein the insufficient information includes at least one of an employee name and a department.

7. The method of claim 1, wherein the first identifier is a barcode.

8. A method for scanning and importing documents into a document management system, comprising:
   providing a plurality of identifiers, the plurality of identifiers comprising:
      a plurality of full information identifiers, wherein a full information identifier provides information to import a document into the document management system;
      a plurality of partial information identifiers, wherein a partial information identifier provides information to forward a document to a recipient, wherein the recipient is selected from a plurality of different recipients based on the partial information identifier, and the second document is not imported into the document management system until the recipient provides second sufficient information for the second document to be imported into the document management system;
      a separator identifier, wherein the separator identifier indicates that a new document will be scanned;
   reviewing a first document and a second document to be imported into the document management system;
   associating a first document with a first identifier, the first identifier being one of a full information identifier and a partial information identifier;
   assigning the first identifier to the first document;
   associating a second document with a second identifier, the second identifier being one of a full information identifier and a partial information identifier;
   determining whether the second identifier is the same as the first identifier;
   assigning to the second document one of the second identifier and the separator identifier, wherein the separator identifier is assigned to the second document if the second identifier is the same as the first identifier; and
   scanning the assigned first identifier, the first document, the assigned one of the second identifier and the separator identifier, and the second document.

9. The method of claim 8, wherein the plurality of identifiers include a plurality of barcodes.

10. The method of claim 8, wherein the plurality of full information identifiers includes at least one of a client number and a client name.

11. The method of claim 8, wherein the plurality of full information identifiers includes at least one of an employee name and a department.

12. The method of claim 8, wherein assigning the first information identifier includes printing the first information identifier and attaching the first information identifier to the first document.

13. The method of claim 8, wherein the separator identifier is assigned to the second document.

14. The method of claim 8, wherein the separator identifier is assigned to a third document.

15. The method of claim 8, wherein the second identifier is a partial information identifier.

16. The method of claim 15, further comprising:
   receiving second document at an inbox associated with a first recipient; and
   importing the second document into the document management system from the inbox.

17. The method of claim 16, wherein an inbox administrator views reports on inbox statistics of the first recipient.

* * * * *